July 4, 1967 L. A. DERWIN 3,329,051
FIBROUS MATERIAL CUTTING TOOL
Filed Jan. 19, 1965
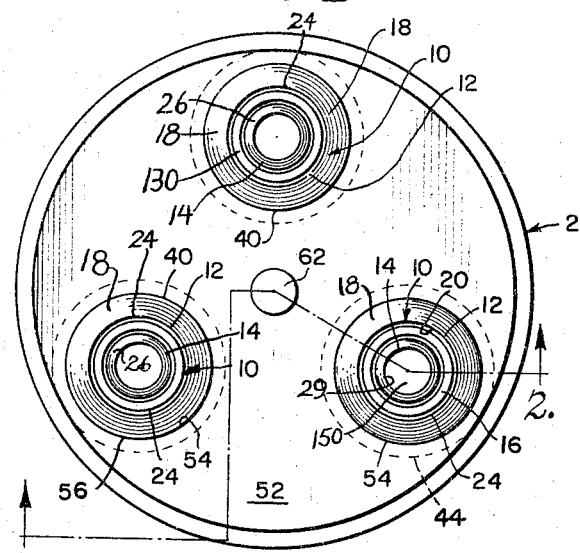
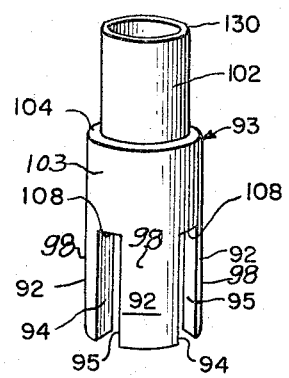
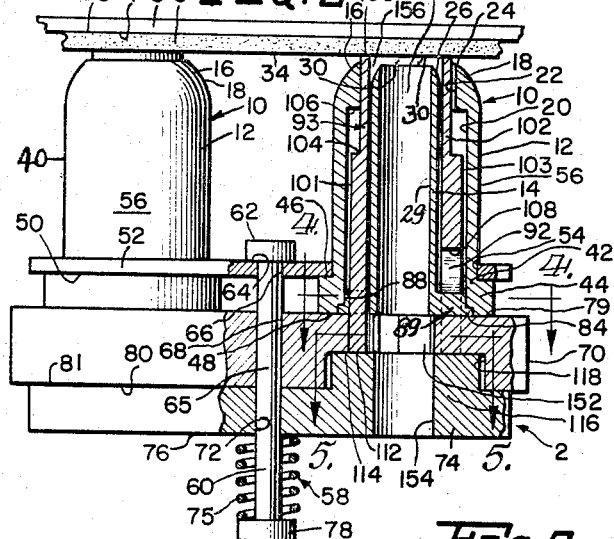
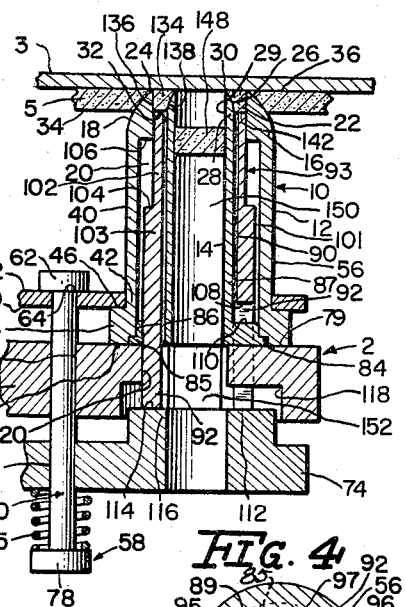
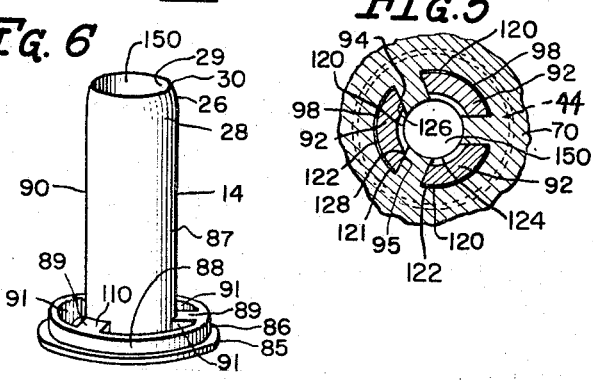
INVENTOR.
Louis A. Derwin
BY John J. Kowalik
Atty.

United States Patent Office  
3,329,051  
Patented July 4, 1967

3,329,051  
FIBROUS MATERIAL CUTTING TOOL  
Louis A. Derwin, 4508 Cross St.,  
Downers Grove, Ill. 60515  
Filed Jan. 19, 1965, Ser. No. 426,555  
7 Claims. (Cl. 83—125)

ABSTRACT OF THE DISCLOSURE

A cutting tool for fibrous material comprising concentric inner and outer cuttings elements and an ejector therebetween, each cutting element having an internal cylindrical surface and an external convex edge portion converging with the internal cylindrical surface of the respective element to a cutting edge, the outer convex surface of the inner cutting element and the opposing cylindrical surface of the outer cutting element defining a wedge area which compresses the material being cut radially to prevent rolling of the material while the ejector holds the material being out against the backing plate.

---

This invention relates to cutting tools and more specifically to a tool particularly designed to cut discs or washers out of felt or synthetic material.

Although the art of punching washers or rings from material has been highly developed, the equipment heretofore available has had serious limitations. Felt and synthetic material such as nylon "Dacron" etc., are difficult materials to cut. Such materials are resilient and the intermeshed fibers resist shearing. In cutting out rings or washers which have an overall diameter or O.D. slightly larger than the internal diameter or I.D., particularly on the order of ⅛ of an inch difference, the material tends to twist and resists shearing. At best a raggedy cut was obtained and frequently the cut was only partial.

A principal object of this invention is to provide a novel material cutting tool for cutting washers and the like.

A further object is to provide a cutting tool for accurately and consistently cutting material as described into rings wherein the difference between the O.D. and I.D. are of the nature of about ⅛".

The invention contemplates a cutting tool in which the material is caused to be wedged and compressed radially to prevent the material from rolling as the tool shears through the material.

More specifically, the invention contemplates a pair of coaxially arranged cutting elements, one of the elements having a cylindrical cutting edge guide surface and the other having a cylindrical cutting edge and a conically shaped guide surface converging toward the cylindrical surface of the other element, whereby the ring of material as it is cut between the cutting edges is caused to wedge between the guide surfaces to prevent rolling of the material.

These and other objects and advantages inherent in and encompassed in the invention will become more readily apparent in the specification and the drawings, wherein:

FIGURE 1 is a top plan view of the cutting tool;

FIGURE 2 is a side elevational view partly in vertical section taken substantially on line 2—2 of FIGURE 1 showing the parts preparatory to cutting;

FIGURE 3 is a sectional view similar to FIGURE 2 of one of the cutting tools showing the parts cutting the material;

FIGURE 4 is a cross-sectional view taken substantially on line 4—4 of FIGURE 2;

FIGURE 5 is a further cross-sectional view taken substantially on line 5—5 of FIGURE 2;

FIGURE 6 is a perspective view of the inner cutting element; and

FIGURE 7 is a perspective view of the knock-out element.

Describing the invention in detail, there is shown a material cutting device generally designated 2 including a metallic or solid plastic material backing plate or die 3 which is relatively unyielding and provides a bottom substantially flat surface 4 against which the material 5 such as felt or synthetic material is laid. The material is normally about ¼" thick and may be in the form of a strip and may be pulled through the tool 2 in a continuous automated system.

In the instant structure, there are shown three compound cutters 10, 10. Each cutter 10 is identical with the others except for being displaced from the other two.

Each cutter 10 comprises an outer tubular or cylindrical cutting tool 12 and an inner cylindrical cutting tool 14 which is concentric with tool 12 and spaced radially inwardly therefrom.

The outer tool 12 has a frusto-conical cutting end portion 16 which has a convex outer surface 18 and an internal bore 20 defined by a cylindrical internal surface 22 which converges with the surface 18 into a sharp cutting edge 24.

The cylindrical surface 22 surrounds and opposes and is in radial alignment with an outer convex generally conical surface 26 on the outer end portion 28 (FIGURE 6) of the inner tool 14. The surface 26 converges upwardly or outwardly with respect to a cylindrical internal surface 29 of the inner tool and merges into a cutting edge 30 which is coplanar with edge 24.

The surface 26 converges with the surface 22 in a direction axially away or downwardly from the cutting edges 24, 30.

This structure is essential to the effective operation of the device. As best seen in FIGURE 3, the initially cut portion 32 of the material 5 is compressed or wedged between the converging surfaces 22, 26, thus holding the cut portion 32 of the material as it is being cut from its near side 34 through its remote side 36.

The wedge angle is of the nature of about 30°–45°, it being understood that dense material would entail a larger angle and loose material a smaller angle.

The outer cutter 12 has a cylindrical outer surface 40 and at its anchor end 42 is provided with an outturned annular mounting ring 44 which has top and bottom surfaces 46 and 48. The top surface 46 engages the bottom side 50 of a clamp plate 52 which has cylindrical openings 54 therethrough complementally receiving the body portions 56 of cutters 12.

The clamp plate 52 is held in engaged position with flange rings 44 by a resilient biasing means 58 in the form of a bolt 60 which has a head 62 engaging the top side 64 of plate 52. The bolt has a shank 65 which extends through aperture 66 in plate 52 and through aperture 68 in an intermediate plate 70 and through the opening 72 in the plate 74. A spring 75 is compressed between the lower surface 76 of plate 74 and a nut 78 on the lower end of shank 65. Spring 75 draws the plate 52 against shoulders 44 on cutters 12 which have their lower sides 48 engaged with top surface 79 of plate 70. The plate 70 has a bottom side 80 engaged with top side 81 of plate 74.

The lower end of each ring 44 of each outer cutter 12 is formed with an internal annular recess 84 which snugly receives a complementary annular shoulder 85 of a ring 86 at the lower end of the cylindrical body portion 87 of the inner cutter tool 14. The ring 86 extends above shoulder 85 and has an external surface 88 closely or complementally fitting into the enlarged portion of the internal bore 20 of cutter 12.

The ring 86 is connected by a plurality, preferably three, radial equally spaced ribs 89 with the lower end of the body portion 87 of the inner cutter 14 and define with the cylindrical exterior 90 of the body portion 87 of the inner tool 14 three sector apertures 91 (FIGURE 6) through which project three extensions or guides 92 of a punch-out tool 93.

The guides 92 each have radial edges 94, 95 which are in guided engagement with edges 96, 97 on the opposing ribs 89. The outer circumferential surface 98 of each guide 92 is guided along a complementary segment of interior surface 99 of ring 86.

Surface 99 is of smaller diameter than the enlarged lower portion of internal bore surface 20 so that there is a running clearance space (FIGURES 2 and 3) at 101 therebetween.

The punch-out tool 93 is of reduced diameter at its upper end portion 102 and presents on an intermediate portion 103 an upwardly facing shoulder 104 which opposes a downwardly facing shoulder 106 on the lower end of the upper portion 16 to prevent withdrawal of the tool 93.

The sectors of the lower edge 108 of the intermediate portion between guides 92 oppose upper edges 110 of the ribs 89 which limits downward movement of the punch-out tool 93.

The lower ends 112 of the guides 92 of each punch abut against the top side 114 of an associated boss 116 provided on the top side of the back-up plate 74, there being three such bosses 116 equal in number to the number of cutters 10 and in axial alignment with respect thereto.

Each boss 116 projects into a cavity 118 in the underside of plate 70. Plate 70 has three arcuate vertical slots 120 which admit the respective guides 92 therethrough. Each slot 120 has an outer arcuate sector surface 122 guidably engageable with the arcuate surface 98. The inner curved surface of each guide, which is arcuate in cross-section, is spaced radially outwardly of the exterior of the inner edge 124 of each slot 120. The side edges 94, 95 have guided engagement with the side edges 126, 128 of each slot 120.

*Operation of the device*

In operation the felt strip of material 5 is drawn under the plate 3. The upper end 130 of the punch-out tool 93 extends upwardly beyond the sharp cutting edges 24 and 30 and engages the underside 34 of the material. The top platen 3 is advanced relatively toward the cutters 10. This causes the punch-out tools 93 to retract below the cutting edges 24, 30 which then shear the material 5. As the upper platen continues to descend, the back-up plate 74 is urged downwardly against the resistance of spring 75 compressing the same and the guide lugs 92 reciprocate within the slots 91 and 120 which are in vertical alignment with each other.

As the material is being sheared, a ring 134 is formed having outer and inner annular surfaces 136, 138 engaged with the cylindrical internal surface 22 and the downwardly and outwardly sloping surface 26, while the lower edge 142 bears against the upper edge 130 of the punch-out tool and the upper side 36 of the material of the washer 134 engages the bottom surface 4 of the platen 3. The bottom portion of the washer is wedged between the surfaces 22–26 and is compressed radially as the upper portion of the washer is being cut. Thus, it will be seen that a clean shearing action against the material by the cutting edges 20, 26 continues from one side of the material through the other. Rolling of the material is prevented by the clamping or holding action developed by the wedging engagement of the material with the cutting tools.

The convex surface 18 also wedges the material outwardly of the ring 134 against the platen 3.

The center slug 148 punched out of each washer 134 exits through the cylindrical center bore 150 in the inner tubular tool 14 and progresses, upon accumulations of slugs, through a coaxial opening 152 in plate 70 and another registering opening 154 in the lower plate 74.

After the washer 134 is cut out of the stock of material 5, the cutters and plate 3 are relatively separated axially when the cutters and the punch-out tool is caused to ascend (by expansion of spring 75) discharging the washer from the annular space 156 (FIGURE 2) between the inner and outer cutters. The operation is repeated sequentially as described.

The instant device is presently in successful operation and has solved the problems heretofore enumerated.

One embodiment of the invention has been disclosed. However, variations will be readily apparent to those skilled in the art within the scope of the appended claims.

I claim:

1. In a device for cutting rings from fabric material, inner and outer cylindrical cutting elements arranged in concentric telescoped relationship, said outer element having a bore defined by a cylindrical face and having an annular cutting edge circumscribing said face, said inner element having a bore with a cylindrical surface and an outer surface converging with said cylindrical surface of the inner element and defining a cutting edge therewith substantially coplanar with the cutting edge of the outer element.

2. The invention according to claim 1 and said outer surface spaced radially inwardly from said cylindrical face and defining a wedge area therewith.

3. In an apparatus for cutting rings from a fibrous material and the like, a cutter assembly and a material backing structure adapted to support the material athwart said cutter assembly, said assembly comprising a pair of tubular inner and outer cutting elements having cutting edges at corresponding ends, said outer element having an internal cylindrical surface and an external convex surface diverging from the internal surface in a direction away from its cutting edge disposed substantially normal to the plane of the material to be cut, said inner element having an external convex surface opposing said internal cylindrical surface of said outer element and diverging away therefrom toward said cutting edges, and having an internal cylindrical surface extending to its cutting edge.

4. The invention according to claim 3 and a rigid punch-out member interposed between said elements and reciprocal inwardly and outwardly of said cutting edges.

5. In a cutting apparatus, a pair of concentrically arranged inner and outer cutting elements each having a cutting edge at their corresponding ends, the inner of said elements having an annulus at its other end, a plurality of radial ribs interconnecting the annulus with the inner element and defining a plurality of axial slots therewith and with said annulus, a punch-out member between said elements having legs extending through respective slots, said outer element having a shoulder at its other end, clamp plate engaging the shoulder, an intermediate plate adjacent to the clamp plate, said annulus interposed between said outer element, said intermediate plate, and a backing plate behind the intermediate plate, means biasing said plates into engagement and clamping the elements at the shoulder and annulus between the clamp and intermediate plates, said legs of the punch-out member reacting against said backing plate.

6. The invention according to claim 5 and said inner and outer elements having opposing mutually facing surface areas converging in a direction from the respective cutting edges and providing wedging means for gripping portions of the material impacted therebetween pursuant to cutting the material.

7. In a material cutting apparatus, a pair of cutting elements concentrically arranged and having coplanar cutting edges and defining therebetween a material-receiving space narrowing radially in a direction away from the cutting edges axially of the elements.

References Cited

UNITED STATES PATENTS

| | | | |
|---|---|---|---|
| 115,157 | 5/1871 | Brown et al. | 83—124 |
| 468,613 | 2/1892 | Frist | 83—125 |
| 1,102,676 | 7/1914 | McNutt et al. | 83—124 |

WILLIAM W. DYER, JR., *Primary Examiner.*